Oct. 30, 1951 H. WOLBAUM 2,573,377
GRINDER ATTACHMENT FOR ELECTRICAL FOOD MIXERS
Filed Oct. 27, 1950 2 SHEETS—SHEET 1

INVENTOR.
HARRY WOLBAUM
BY
McMorrow, Berman + Davidson
ATTORNEYS

Oct. 30, 1951          H. WOLBAUM          2,573,377

GRINDER ATTACHMENT FOR ELECTRICAL FOOD MIXERS

Filed Oct. 27, 1950          2 SHEETS—SHEET 2

INVENTOR.
HARRY WOLBAUM
BY
McMorrow, Berman & Davidson
ATTORNEYS

Patented Oct. 30, 1951

2,573,377

UNITED STATES PATENT OFFICE 2,573,377

GRINDER ATTACHMENT FOR ELECTRICAL FOOD MIXERS

Harry Wolbaum, Braddock, N. Dak.

Application October 27, 1950, Serial No. 192,496

1 Claim. (Cl. 51—241)

This invention relates to a grinding apparatus, and more particularly to a grinder for attachment to an electric food mixer.

An object of this invention is to provide a grinder which is particularly adapted for attachment to a horizontally or vertically disposed power take-off of a conventional electric food mixer with speed and facility.

Another object of this invention is to provide a grinder for attachment to an electric food mixer which is particularly useful for the sharpening of small tools, such as knives, scissors, surgical and dental instruments, and the like.

A further object of this invention is to provide a grinder for attachment to an electric food mixer which is extremely durable yet light and compact, and is easily attachable to the power take-off of the electric food mixer.

A still further object of this invention is to provide a grinder for attachment to an electric food mixer which is relatively simple in structure and cheap to manufacture.

The above and still further objects and advantages of the present invention will become apparent upon consideration of the following detailed description of the invention when taken in conjunction with the following drawings, wherein.

Figure 1:
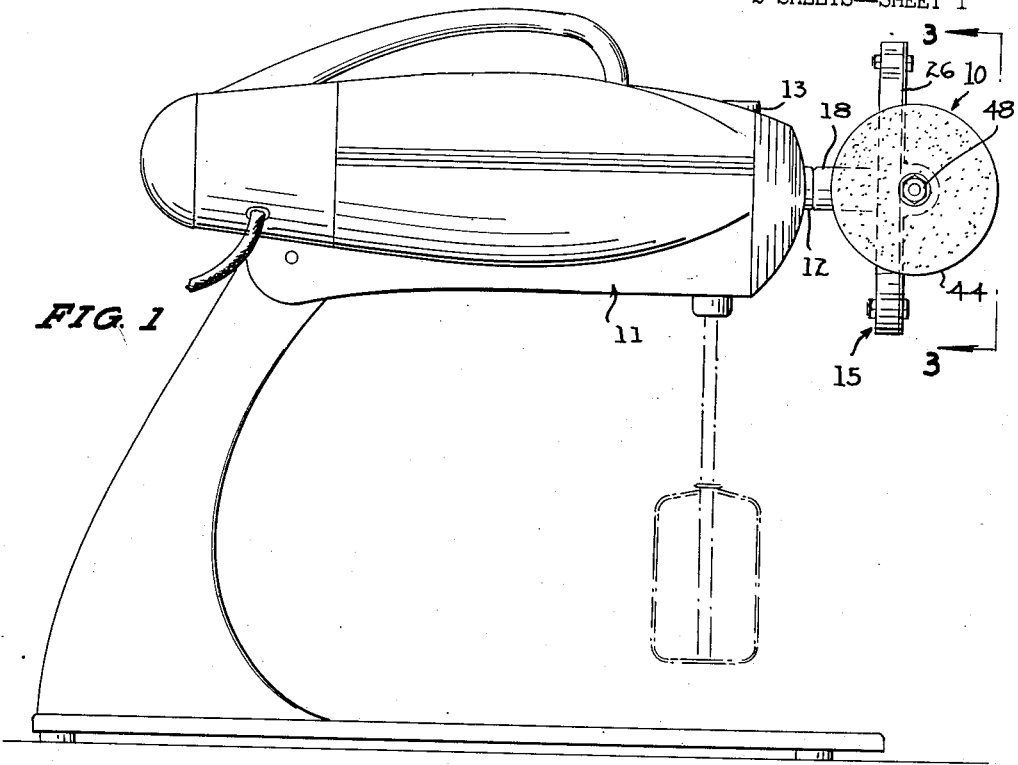
Figure 1 is an elevational view of the grinder attachment of the present invention, shown connected to a horizontally disposed power take-off of a conventional electric food mixer.

Referring now more particularly to the drawings, wherein like reference numerals have been used throughout the several views to designate like parts, there is shown the grinder attachment of the present invention, generally designated by the reference numeral 10, which is particularly adapted for attachment to either the horizontally disposed power take-off 12 of the conventional electric food mixer 11 or to the vertically disposed power take-off 13 of the mixer 11.

The grinder attachment comprises a flat cylindrical housing 15 having a closed end 16 and an open end 17. Disposed axially of the closed end 16 of the housing 15 is a hollow, cylindrical extension 18 which has one end secured to the bottom 16 in communication therewith. Positioned longitudinally within the extension 18 is a plain bearing sleeve 19 which is secured within the extension 18.

Figure 4:
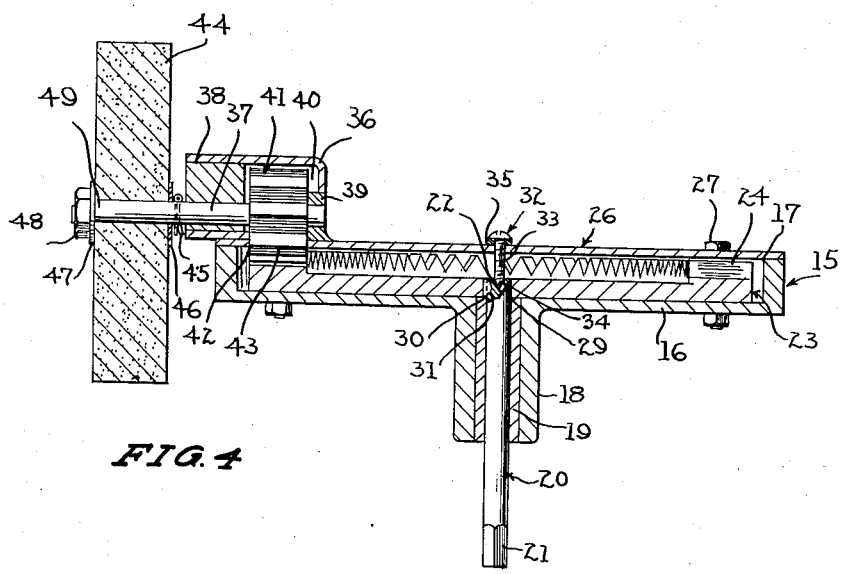
Figure 4 is a sectional view taken along the line 4—4 of Figure 3.

Rotatably supported within the bearing sleeve 19 is a plain drive shaft 20 which has one end projecting beyond the free end of the extension 18 and squared, as designated by the reference numeral 21, for connection within the complementary socket of either power take-off of the mixer 11. As clearly shown in Figure 4, the end of the drive shaft 20 remote from the squared end 21 terminates in the housing 15 and is provided with an axial bore 22 which terminates adjacent to and spaced from the end thereof received within the housing 15.

Positioned within the housing 15 is a crown gear 23 which has one face disposed in confronting relation with respect to the closed end 16 of the housing 15, and with its gear teeth 24 facing the open end of the housing. The face of the gear 23 within the teeth 24 is dished and provided with the radially extending cutouts 25. The amount of material removed from the face of the gear 23 is selected so that the gear 23 will have the desired strength yet be relatively light in weight.

Closing the open end 17 of the housing 15 is a cover 26 which is detachably secured to the housing 15 by means of the circumferentially spaced bolts 27 which are extended through the outwardly projecting, radially disposed ears 28 of the cover 26 and received within the adjacent portions of the housing 15.

Suitable means are carried by the crown gear 23 and are engaged with the adjacent end of the drive shaft 20 for operatively connecting the drive gear 23 to the drive shaft. As clearly shown in Figure 4, the drive gear is provided with an axial aperture 29 which receives the adjacent portion of the drive shaft 20, the bounding wall of the aperture 29 being provided with a key 30 receivable within a keyway 31 provided longitudinally in the drive shaft 20. Positioned in end-to-end, spaced relation with respect to the bore-provided end of the drive shaft 20 is a threaded thrust and guide pin 32 which is threaded axially through the cover 26 for movement into and out of engagement with the drive shaft 20. As clearly shown in Figure 4, the pin 32 includes a threaded shank 33 and has its free end provided with a conical extension 34 engageable with the terminating end of the bore 22. Circumpoosed about and supported upon the threaded shank 33 of the pin 32 is a lock nut 35 for holding the pin 32 in selected adjusted positions with respect to the shaft 20.

Disposed radially of the cover 26 is a casing 36 which is fixedly secured on the outer side of the cover or formed integrally therewith. Rotatably journaled within and longitudinally of the casing 36 is a driven shaft 37 which has one end projecting exteriorly of the casing 36 and outwardly of the cylindrical housing 15. The driven shaft 37 is rotatably journaled by means of the spaced bearing sleeves 38 and 39 carried within the casing 36 contiguous to the ends thereof. It is to be noted that the casing 36, and the bearing sleeves 38 and 39 cooperate together to define a chamber 40 within the casing 36.

Disposed transversely of the casing 36 within the chamber 40 is a pinion 41 which is secured to the driven shaft 37. The pinion projects through a slot 42 provided in the cover 26 and the adjacent portions of the casing 36 and has its teeth 43 in meshing engagement with the radially extending teeth 24 of the drive gear 23.

Supported transversely of the projecting end of the driven shaft 37 is a grinding wheel 44. The grinding wheel or grindstone 44 is held against displacement on the driven shaft 37 by means of the assembly of the cotter key 45 and the stop washer 46 which engage one face of the grinding wheel 44 and the assembly of the stop washer 47 and the nut 48 which engage the opposite face of the grinding wheel 44. The free end adjacent portion of the driven shaft 37 is threaded, as indicated by the reference numeral 49, for the support thereon of the threaded nut 48.

Figure 2:
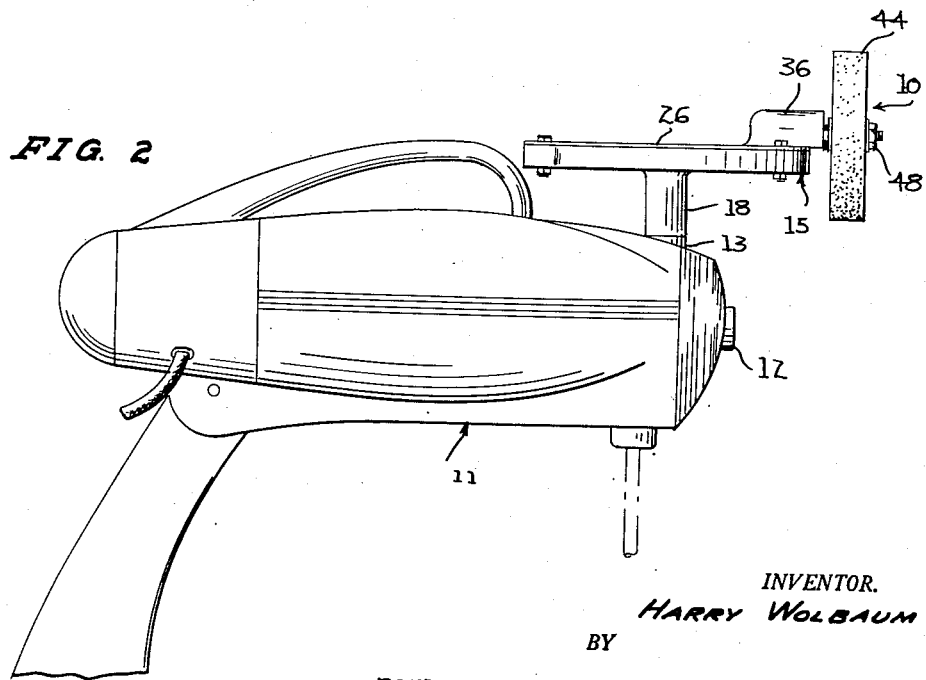
Figure 2 is an elevational view of the grinder attachment of the present invention shown connected to a vertically disposed power take-off of a conventional electric food mixer.
Figure 3:
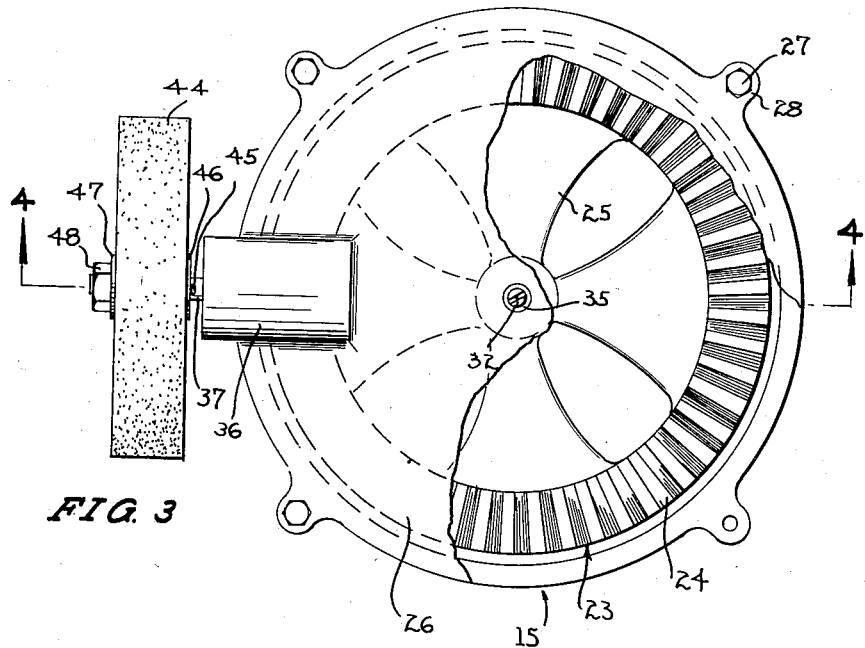
Figure 3 is an enlarged elevational view taken along the line 3—3 of Figure 1, with parts broken away.

In actual use, the grinder attachment can be connected to the horizontally disposed power take-off 12 of the electric food mixer 11, as shown in Figure 1, or attached to the upwardly projecting, vertically disposed power take-off 13 of the mixer 11, as shown in Figure 2. Upon starting the electric motor of the mixer 11, the drive shaft 20 is rotated, whereupon the grinding wheel 44 is rotated due to the operative connection between the drive shaft 20 and the grinding wheel. The grinding attachment of the present invention is particularly adapted for quick and easy dismantling for the replacement of worn or broken parts. Furthermore, the grinding wheel 44 can be detached from the driven shaft 37 by merely removing the threaded nut 48 from the shaft 37 and urging the grinding wheel 44 toward the free end of the driven shaft.

Although only one embodiment of the grinding attachment of the present invention has been described, it is readily apparent that numerous modifications can be made without departing from the spirit of the invention as set forth in the appended claim.

What I claim is:

In a grinder attachment for a food mixer having a power take-off, a hollow cylindrical housing having a closed end and an open end, an axial extension on and projecting axially outwardly from said closed end of the housing, said extension being formed with a plain bore opening through said closed housing and into the interior of the housing, a plain drive shaft extending slidably and rotatably through the extension bore, said drive shaft having an axially outward end projecting beyond the axially outward end of said extension and an axially inward end projecting into said housing, said axially outward end of the projection being adapted to be secured to the food mixer with the axially outward end of the drive shaft connected to the mixer power take-off, a crown gear within said housing and fixed axially on the axially inward end of said drive shaft, said crown gear having gear teeth projecting toward the open end of the housing and a face confronting the closed end of the housing whereby axial movement of the crown gear in the direction of the closed end of the housing is limited by contact thereof with the closed end of the housing, a cover removably secured to said housing and closing the open end of said housing, the axially inward end of said drive shaft being formed with an axial socket, a thrust and guide pin threaded axially through said cover, said pin having an end rotatably engaging in said socket whereby axial movement of the crown gear in a direction toward the open end of the housing is limited, a casing fixed on the axially outward side of said cover and having bearing means extending radially with respect to said housing, a driven shaft journaled in said bearings, said driven shaft having a radially outward end extending beyond said casing and carrying a grinding wheel, said driven shaft having a radially inward end terminating within said casing and carrying a pinion, said cover being formed with an opening communicating with the interior of said casing through which said pinion extends into mesh with the teeth of said crown gear, said cover, thrust and guide pin, driven shaft, pinion, and grinding wheel being thereby separable as a unit from said housing and drive shaft upon removal of the cover from the housing.

HARRY WOLBAUM.

REFERENCES CITED

The following references are of record in the file of this patent:

UNITED STATES PATENTS

| Number | Name | Date |
| --- | --- | --- |
| 1,417,228 | Blocker | May 23, 1922 |
| 2,006,510 | Oxenhandler | July 2, 1935 |